Nov. 18, 1952     B. J. MAYLAND     2,618,543
PRODUCTION OF CARBON MONOXIDE AND HYDROGEN SYNTHESIS GAS
Filed Aug. 19, 1949
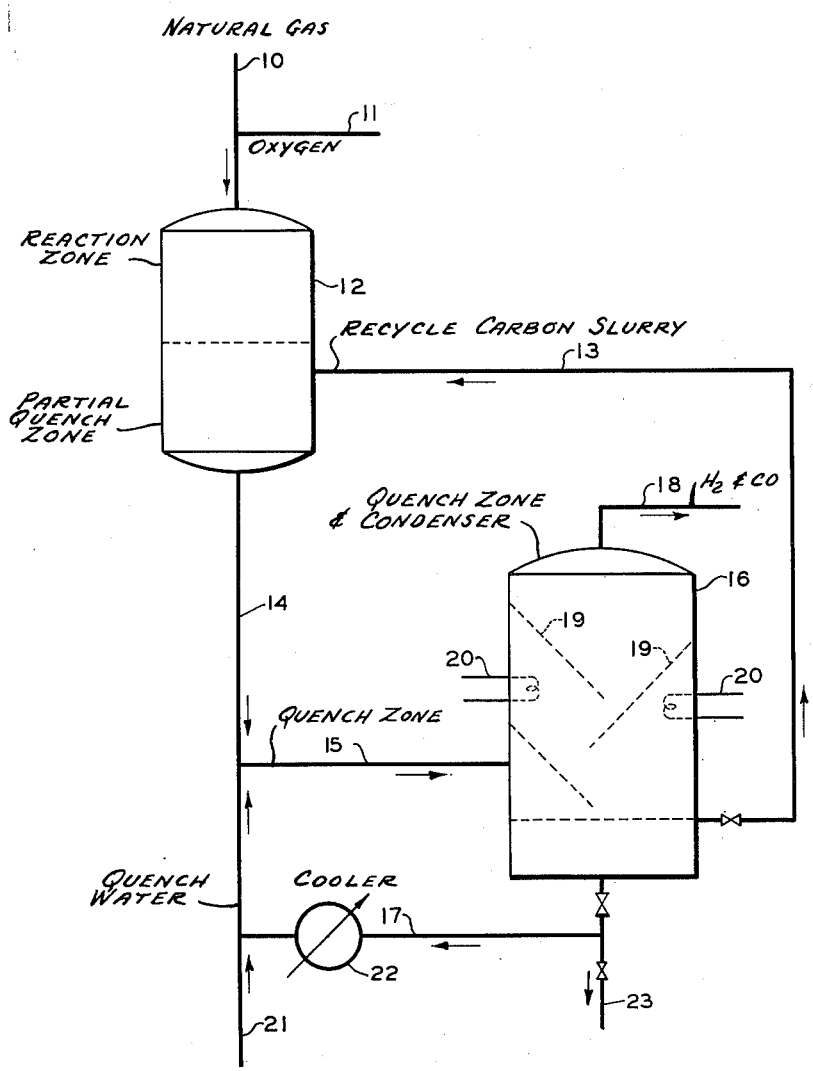
*INVENTOR.*
B. J. MAYLAND
BY Hudson + Young
*ATTORNEYS*

Patented Nov. 18, 1952

2,618,543

UNITED STATES PATENT OFFICE 2,618,543

PRODUCTION OF CARBON MONOXIDE AND HYDROGEN SYNTHESIS GAS

Bertrand J. Mayland, Bartlesville, Okla., assignor to Phillips Petroleum Company, a corporation of Delaware Application August 19, 1949, Serial No. 111,192

8 Claims. (Cl. 48—196)

This invention relates to the manufacture of carbon monoxide and hydrogen synthesis gas by the partial oxidation of methane, natural gas, and other related light hydrocarbons. In one of its more specific aspects, this invention relates to the utilization of elemental carbon formed in a partial oxidation process for the manufacture of carbon monoxide and hydrogen synthesis gas to form more synthesis gas.

In the preparation of carbon monoxide and hydrogen synthesis gas by the partial oxidation of natural gas or other methane-containing gas, or related light hydrocarbons, a certain amount of the carbon content in the feed gas appears as elemental finely divided carbon in the effluent gas. The carbon formed in this manner represents a loss in process efficiency. At the same time, oxygen which is intended to form carbon monoxide by the partial oxidation of the carbon reacts with some of the desirable product, carbon monoxide and hydrogen, to give undesirable carbon dioxide and water, further reducing the efficiency of the process. The amount of carbon formed can be reduced in a number of ways such as increasing the oxygen to natural gas ratio in the feed, adding steam to the feed to make the product gas more oxidizing, or adding carbon dioxide for the same reason. However, all of these solutions of the problem are uneconomical since they involve increased oxygen demand to produce a given amount of synthesis gas; and in addition, in the latter two cases increased oxygen is required to furnish the sensible heat to raise the steam or carbon dioxide to reaction temperature. Furthermore, these solutions are uneconomical because they increase the amount of natural gas burned to undesirable carbon dioxide and water. In any event, even under favorable operating conditions, the carbon formed may amount to 1 to 2 per cent of the carbon content of the feed gas, and under less favorable conditions may amount to 4 to 5 per cent or more of the carbon content.

An object of this invention is to produce carbon monoxide and hydrogen synthesis gas.

Another object of this invention is to produce carbon monoxide and hydrogen synthesis gas by the partial oxidation of methane, natural gas, and/or related light hydrocarbons.

Another object of this invention is to increase the overall efficiency of a partial oxidation process for the manufacture of carbon monoxide and hydrogen synthesis gas.

Still another object of this invention is to reduce the loss of product formed by the partial oxidation of methane, natural gas, and/or related light hydrocarbons due to the formation of elemental carbon.

Another object of this invention is to utilize elemental carbon formed during the partial oxidation of hydrocarbons to produce carbon monoxide and hydrogen synthesis gas therefrom.

Further objects and advantages of this invention will be apparent to one skilled in the art from the accompanying disclosure and discussion.

I have discovered that the efficiency of a hydrocarbon partial oxidation synthesis gas manufacturing process for the production of carbon monoxide and hydrogen may be greatly improved by recovering elemental carbon formed in the reaction in an aqueous slurry and recycling same to the reaction zone where the carbon reacts with the water therein, which is in the form of steam, in an endothermic reaction, to form additional synthesis gas. The water introduced in the aqueous slurry acts as a quench for the partial oxidation products as does the endothermic reaction of carbon with steam.

In accordance with my invention, carbon formed in the partial oxidation of methane, natural gas, and/or other related light hydrocarbons with oxygen or an oxygen-containing gas is collected in the water condensed from the effluent gas. This water may comprise that formed during the partial oxidation reaction and also water utilized in the quench step. The carbon-water slurry is recovered and introduced as a spray to a point within the reaction zone where initiation of quench is desired. A suitable mole ratio of carbon to water is 1:1, however more water may be used if desired. By heat radiation from the hot walls of the reaction chamber and by contact with the hot combustion gases, the carbon particles and water are raised to reaction temperature, that is, the temperature at which they react with one another by the water-gas reaction which has been found to be above 1100 to 1200° F. and preferably in the range of 1500 to 2300° F. By introducing the carbon-water slurry as a quench and by reacting the carbon and water of the slurry by the water-gas reaction which is an endothermic reaction, the temperature of the partial oxidation products may be reduced to as low as 1800° F. Since the carbon particles are associated with a blanket of steam from the water used to slurry them, a high conversion of carbon to carbon monoxide and hydrogen is attained. Following the first quench step the reaction products, i. e. those from the partial oxidation step and those from the water-gas reaction between carbon and water, are further quenched as by contact with additional water either in direct or indirect heat exchange to further reduce the temperature to in the neighborhood of 800 to 900° F. which is below the carbon deposition range.

The point of introduction of the carbon-water slurry to the partial oxidation reaction zone is critical and is dependent on several factors. It is well known that the partial oxidation reaction takes place in two partially overlapping steps. In the first of these, the feed gas and oxygen, as from air, react to form considerable carbon dioxide and water as well as carbon monoxide and hydrogen, leaving some unreacted hydrocarbon. The unreacted feed then reacts with the carbon dioxide and steam to form additional carbon monoxide and hydrogen. In the second step of the reaction which takes place simultaneously with the reaction of the carbon dioxide and steam with the residual feed, the competing reaction of hydrocarbon cracking occurs. Since the activation energy for the reforming reaction is higher than that of the cracking reaction, a higher temperature level tends to reduce carbon deposition from cracking. Hence, it is undesirable to use diluents or quench streams such as a carbon-water slurry at a point where these reactions are occurring since the net effect will be to reduce the temperature level of the reactants and thereby increase the carbon deposition. It is, however, desirable and advantageous to add the carbon-water slurry at some point further along in the reaction to provide a partial quench not only by sensible and latent heat transfer, but also by the endothermic nature of the steam-carbon reaction. Usually a partial oxidation reaction time in the range of 0.05 to 2.0 minutes is sufficient and by knowing the flow rate of the reactants in the reaction chamber and the contact time desired, the exact location of the carbon slurry inlet may be readily determined. Utilizing appropriate stream quantities, the combustion products may be quenched down near to the carbon deposition temperature. If excess water is present in the slurry, the carbon deposition temperature of the resulting mixture is even lower. When the temperature of the reaction mixture is within the carbon deposition temperature range, the thermodynamics of the reaction are such that carbon will tend to deposit. For this reason it is desirable to minimize the residence time of the gas in the carbon forming temperature range to a point where the reaction rates are negligible. This may be accomplished by quenching the gas so that its temperaure is rapidly reduced to below this range and so its residence time in the carbon forming temperature range is so short that the extent of the reaction producing carbon is negligible.

The elemental carbon which is to be recycled as by an aqueous slurry is formed partially during the initial combustion reaction and also in the cooling step. This carbon is removed from the system suspended in the gaseous reaction products. It has been found that by passing the synthesis gas product containing the suspended carbon through a baffled chamber, or other chamber having a similar effect, cooling same therein, and also condensing the water vapor, that the carbon is collected in the condensed water. The condensate includes not only water formed in the combustion reaction, but also unreacted water from the aqueous carbon slurry and secondary quench water. It has been found further that the carbon tends to float on the surface of the condensed water so that a separation is easily effected between the bulk of the water and a concentrated aqueous carbon slurry.

A more detailed understanding of some of the many aspects of my invention may be had by referring to the attached drawing, which is a schematic flow diagram, in conjunction with the following discussion. Various additional valves, pumps, and other conventional equipment necessary for the practice of this invention will be familiar to one skilled in the art and have been omitted from the drawing for the sake of clarity. This description of the drawing provides one method of operating my process, and, while it is representative in general of my process, various minor changes may be made in adapting the process to the various conditions within the scope of the invention.

Natural gas to be partially oxidized is passed via line 10 to partial oxidation reaction zone 12. Oxygen to be reacted with the natural gas is introduced via line 11 to line 10 where it is admixed and through which the admixture is passed to the reaction chamber. The oxygen and natural gas mixture burns and forms essentially equilibrium gaseous products with some elemental carbon in the reaction zone of chamber 12. The reaction gases pass from the reaction zone to the partial quench zone where they are contacted with an aqueous slurry of recycled carbon which is sprayed into the partial quench zone from line 13. By radiation and conduction, heat is picked up by the spray droplets sufficient to vaporize the water and react the carbon with the thus-formed steam. Sufficient excess water may be added as part of the carbon slurry to reduce the temperature of the gas leaving the partial quench zone down to about 1800° F. The partially quenched reaction products are removed from the partial quench zone of chamber 12 via line 14 and are passed to a secondary quench zone comprising line 15 and chamber 16 where their temperature is further reduced. In line 15, the partially quenched materials are contacted with recycled cooling water from line 17 and cooler 22 and/or line 21 and their temperature reduced to about 800 to 900° F. It is within the scope of my invention to dispense with cooler 22, obtaining sufficient cooling in line 15 and chamber 16. The gas, further cooled in this manner, passes into chamber 16 where it is cooled as by coils 20 to a temperature at which steam will condense out. Excess water recovered from chamber 20 may be withdrawn via line 23 as desired. In this secondary cooling step, small amounts of elemental carbon are formed by the decomposition of the carbon monoxide. The carbon already present in the reaction gases and that formed during the quench in chamber 16 is separated from the gases by the quench water. From quench chamber 16 the gaseous mixture from which the elemental carbon has been separated, is removed via line 18. Numerals 19 indicate the baffles in chamber 16 and numerals 20 indicate cooling coils which may be used therein. The quench water and the elemental carbon collect in the bottom of chamber 16. The carbon which floats on top of the water is withdrawn with a portion of the water through line 13. The remainder of the water is withdrawn from the bottom of the chamber via line 17 and is recycled to line 14. Makeup quench water may be introduced to line 17 via line 21.

Advantages of this invention are illustrated by the following example. The reactants and their proportions, and other specific ingredients are presented as being typical and should not be construed to limit the invention unduly.

Example

Natural gas and oxygen in the ratio of 0.764 mol of oxygen per mol of natural gas are partially combusted in a reaction chamber. The gaseous product consists of 2.92 mol per cent carbon dioxide, 0.30 mol per cent oxygen, 28.90 mol per cent carbon monoxide, 53.10 mol per cent hydrogen, 1.49 mol per cent unreacted hydrocarbon, 2.53 mol per cent nitrogen, and 10.79 mol per cent water. By this partial oxidation reaction there are 3.11 mols of the above reaction mixture produced per mol of natural gas charged. Approximately 4.1 mol per cent of the carbon in the feed appears in the product gas as elemental carbon. The efficiency of the process, which is the ratio of hydrogen plus carbon monoxide produced to the maximum hydrogen plus carbon monoxide theoretically obtainable from the natural gas as expressed in mol per cent, is 80 per cent. On the basis of one mol of natural gas, recycling the carbon with water in a mol for mol ratio and reacting same produces approximately 0.092 mols of active carbon monoxide and hydrogen, the relative amounts of carbon monoxide and hydrogen depending upon the amount of excess steam. This additional carbon monoxide and hydrogen represents a gain in the production of active synthesis gas, and the efficiency of the process is now raised to 83.5 per cent.

Advantages of my invention as disclosed herein are improved efficiency in the production of carbon monoxide and hydrogen, reduction in consumption of hydrocarbon feed and oxygen for heating purposes, and recovery of maximum yields of product carbon monoxide and hydrogen synthesis gas per unit of feed.

I claim:

1. A process for the manufacture of carbon monoxide and hydrogen which comprises partially oxidizing a light hydrocarbon with oxygen and thereby producing carbon monoxide and hydrogen and a minor quantity of elemental carbon, partially quenching the partial oxidation products to a temperature above 1100 to 1200° F. and simultaneously producing more hydrogen and carbon monoxide by introducing an aqueous slurry of elemental carbon directly into said partial oxidation products, further quenching the products of partial oxidation to a temperature below the carbon forming temperature range, recovering from said quenched products an aqueous slurry of elemental carbon and utilizing same as at least part of the partial quench, and thereby improving the carbon monoxide and hydrogen producing efficiency of the partial oxidation process.

2. A process for the manufacture of carbon monoxide and hydrogen synthesis gas which comprises partially oxidizing a light hydrocarbon with oxygen and thereby producing carbon monoxide and hydrogen and a minor quantity of elemental carbon, partially quenching the products of said partial oxidation and simultaneously producing more hydrogen and carbon monoxide by introducing an aqueous slurry of elemental carbon directly into said partial oxidation products, further quenching the partial oxidation products to a temperature below the carbon forming temperature range and removing water and elemental carbon, recovering an aqueous slurry of said elemental carbon and utilizing same as said partial quench, effecting said partial quench by vaporizing the water of said slurry and heating same and the elemental carbon to a temperature above 1100 to 1200° F. by heat exchange with the products of the partial oxidation, and recovering carbon monoxide and hydrogen synthesis gas as a product of the process.

3. A process for the manufacture of carbon monoxide and hydrogen synthesis gas which comprises partially oxidizing methane with oxygen for a period of time in the range of 0.05 to 2.0 minutes and thereby producing carbon monoxide and hydrogen and a minor quantity of elemental carbon, partially quenching the products of said partial oxidation to a temperature of about 1800° F. and simultaneously forming additional hydrogen and carbon monoxide by the direct introduction of an aqueous elemental carbon slurry, further quenching the partial oxidation products to a temperature in the range of 800 to 900° F. at which no further carbon formation will take place, condensing the steam from said gas and removing the elemental carbon therewtih, recovering an aqueous slurry of said elemental carbon and passing same back directly to said partial oxidation products as said partial quench, introducing the aqueous carbon slurry as above and effecting said partial quench by vaporizing the water of said slurry and heating same and the elemental carbon to a temperature above 1100 to 1200° F., and recovering carbon monoxide and hydrogen synthesis gas as a product of the process.

4. A process according to claim 3 wherein the reaction between the elemental carbon and steam takes place at a temperature in the range of 1500 to 2300° F.

5. A process for the manufacture of carbon monoxide and hydrogen synthesis gas which comprises partially oxidizing a light hydrocarbon with oxygen and thereby producing carbon monoxide and hydrogen and a minor quantity of elemental carbon, partially quenching the partial oxidation products by the introduction of an aqueous elemental carbon slurry and simultaneously producing additional carbon monoxide and hydrogen, further quenching the partial oxidation products past the carbon forming temperature range, cooling thus quenched materials to condense the water therein, recovering from the quenched and cooled products an aqueous slurry of elemental carbon, passing said slurry back directly to said partial oxidation products and using same as at least part of said quench, utilizing the remaining water obtained by said cooling in said further quench, and thereby improving the carbon monoxide and hydrogen producing efficiency of the partial oxidation process.

6. A process according to claim 5 wherein said light hydrocarbon is partially oxidized with an oxygen-containing gas.

7. A process for the manufacture of carbon monoxide and hydrogen synthesis gas which comprises partially oxidizing a light hydrocarbon with oxygen and thereby producing carbon monoxide and hydrogen and a minor quantity of elemental carbon, partially quenching the products of said partial oxidation and simultaneously producing more hydrogen and carbon monoxide by introducing an aqueous slurry of elemental carbon directly into said partial oxidation products, further quenching the partial oxidation products to a temperature below the carbon forming temperature range, cooling the thus quenched materials and thereby removing the carbon therein with the water condensed therefrom, settling the removed carbon on the condensed water, skimming off a carbon water slurry from said settling and utilizing same as said partial quench, effecting said partial quench by vaporizing the water of said slurry and heating same and the elemental carbon to a temperature above 1200° F. at which they will react with one another to produce additional carbon monoxide and hydrogen, utilizing at least a portion of said condensed water in quenching the partial oxidation products below the carbon forming temperature range, and recovering carbon monoxide and hydrogen synthesis gas as a product of the process.

8. A process according to claim 7 wherein the condensed water utilized as quench is further cooled.

BERTRAND J. MAYLAND.

REFERENCES CITED

The following references are of record in the file of this patent:

UNITED STATES PATENTS

| Number | Name | Date |
|---|---|---|
| 1,373,704 | Bates | Apr. 5, 1921 |
| 2,471,104 | Gohr | May 24, 1949 |

FOREIGN PATENTS

| Number | Country | Date |
|---|---|---|
| 632,499 | France | Jan. 10, 1928 |